US012659816B2

(12) United States Patent
Park et al.

(10) Patent No.: US 12,659,816 B2
(45) Date of Patent: Jun. 16, 2026

(54) METHOD AND APPARATUS FOR MANAGING SYNCHRONIZATION IN COMMUNICATION SYSTEM

(71) Applicant: Electronics and Telecommunications Research Institute, Daejeon (KR)

(72) Inventors: Hyun Seo Park, Daejeon (KR); Yong Jin Kwon, Daejeon (KR); Yun Joo Kim, Daejeon (KR); Han Jun Park, Daejeon (KR); Jung Bo Son, Daejeon (KR); An Seok Lee, Daejeon (KR); Yu Ro Lee, Daejeon (KR); Sung Cheol Chang, Daejeon (KR); Heesoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 417 days.

(21) Appl. No.: 18/500,567

(22) Filed: Nov. 2, 2023

(65) Prior Publication Data

US 2024/0147315 A1     May 2, 2024

(30) Foreign Application Priority Data

Nov. 2, 2022    (KR) ......................... 10-2022-0144294
Nov. 1, 2023    (KR) ......................... 10-2023-0149489

(51) Int. Cl.
*H04W 4/00*         (2018.01)
*H04W 36/00*       (2009.01)
*H04W 56/00*       (2009.01)

(52) U.S. Cl.
CPC ... *H04W 36/0058* (2018.08); *H04W 56/0005* (2013.01)

(58) Field of Classification Search
CPC . H04W 36/00; H04W 36/0058; H04W 56/00; H04W 56/0005
See application file for complete search history.

(56) References Cited

U.S. PATENT DOCUMENTS 9,894,627 B2    2/2018  Choi et al.
10,638,442 B2   4/2020  Kim et al.
(Continued)

FOREIGN PATENT DOCUMENTS

KR    10-2019-0073557 A    6/2019
WO         2018/083649 A1   5/2018

*Primary Examiner* — Elisabeth Benoit Magloire
(74) *Attorney, Agent, or Firm* — Sughrue Mion, PLLC

(57)                ABSTRACT

A method of a terminal may comprise: receiving, from a CU of a base station, configuration information of one or more candidate cells and configuration information for measurement; performing L1 measurement on the candidate cells based on the configuration information for measurement; acquiring uplink synchronization for the candidate cells by performing an uplink synchronization management procedure for the candidate cells based on the configuration information of the candidate cells; reporting a result of the L1 measurement to a DU of the base station; receiving, from the DU of the base station, information on a target cell, being the target cell to switch among the candidate cells, based on the result of the L1 measurement; and applying the uplink synchronization acquired through the uplink synchronization management procedure to the target cell.

12 Claims, 14 Drawing Sheets

(56) References Cited

U.S. PATENT DOCUMENTS

| | | | |
|---|---|---|---|
| 2010/0232327 | A1 | 9/2010 | Kim et al. |
| 2014/0169345 | A1 | 6/2014 | Seo et al. |
| 2018/0049079 | A1 | 2/2018 | Ozturk et al. |
| 2019/0223057 | A1 | 7/2019 | Park et al. |
| 2020/0351971 | A1* | 11/2020 | Fiorani ................. H04W 48/14 |
| 2022/0039175 | A1* | 2/2022 | Zhou ............... H04W 36/00837 |
| 2022/0078796 | A1 | 3/2022 | Kim et al. |
| 2022/0150974 | A1 | 5/2022 | Kim et al. |
| 2022/0232600 | A1 | 7/2022 | Kim et al. |
| 2022/0330323 | A1 | 10/2022 | Kim et al. |
| 2023/0130286 | A1* | 4/2023 | Leng ................. H04W 36/0058 |
| | | | 370/331 |
| 2023/0276283 | A1* | 8/2023 | Hakola ................. H04W 24/10 |
| | | | 370/329 |
| 2024/0022924 | A1* | 1/2024 | Zhou ..................... H04W 24/02 |
| 2024/0244499 | A1* | 7/2024 | Ramachandra ......... H04W 8/08 |
| 2024/0356621 | A1* | 10/2024 | Yuan ................. H04B 7/06964 |
| 2024/0357528 | A1* | 10/2024 | Karabulut ............. H04W 76/10 |
| 2025/0088932 | A1* | 3/2025 | Lin ..................... H04W 36/087 |
| 2025/0227570 | A1* | 7/2025 | Chandrashekar ............................ |
| | | | H04W 36/0072 |

* cited by examiner

FIG. 2

| | octet |
|---|---|
| reserved \| timing advance command | octet 1 |
| timing advance command \| uplink grant | octet 2 |
| uplink grant | octet 3 |
| uplink grant | octet 4 |
| uplink grant | octet 5 |
| temporary C-RNTI | octet 6 |
| temporary C-RNTI | octet 7 |

1

METHOD AND APPARATUS FOR MANAGING SYNCHRONIZATION IN COMMUNICATION SYSTEM

CROSS-REFERENCE TO RELATED APPLICATIONS

This application claims priority to Korean Patent Applications No. 10-2022-0144294, filed on Nov. 2, 2022, and No. 10-2023-0149489, filed on Nov. 1, 2023, with the Korean Intellectual Property Office (KIPO), the entire contents of which are hereby incorporated by reference.

BACKGROUND

1. Technical Field

Exemplary embodiments of the present disclosure relate to a synchronization management technique in a communication system, and more specifically, to a synchronization management technique in a communication system, which facilitates management of uplink synchronization of a candidate cell for a handover of a terminal.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, in the communication system, a terminal may move from a source cell to a target cell, and perform a handover from the source cell to the target cell. In this case, the terminal may use a dual active protocol stack (DAPS) handover technique to reduce an interruption time during which the terminal cannot receive data. According to the DAPS handover technique, the terminal may operate a DAPS packet data convergence protocol (PDCP) entity for the two cells and operate a radio link control (RLC) entity, medium access control (MAC) entity, and physical (PHY) entity for each of the two cells to simultaneously receive and process data from the source cell and the target cell. Accordingly, complexity of the terminal may increase. Meanwhile, the terminal may use a Make-Before-Break (MBB) handover technique to reduce the interruption time. According to the MBB handover technique, the terminal may autonomously determine a time at which the terminal disconnects from the source cell. Therefore, the source cell may not know exactly when the terminal disconnects from the source cell. As a result, an actual interruption time may be larger than a theoretical interruption time. Meanwhile, the terminal may use a RACH-less handover technique that omits a random access (RA) procedure to reduce the interruption time. The RACH-less handover technique may be used limitedly in a handover scenario where a timing advance value is the same in the source cell and the target cell and a handover scenario where a timing advance value is 0.

SUMMARY

Exemplary embodiments of the present disclosure are directed to providing a method and an apparatus for synchronization management in a communication system, which facilitate management of uplink synchronization of a candidate cell for a handover of a terminal.

According to a first exemplary embodiment of the present disclosure, a method of a terminal may comprise: receiving, from a centralized unit (CU) of a base station, configuration information of one or more candidate cells and configuration information for measurement; performing layer 1 (L1) measurement on the one or more candidate cells based on the configuration information for measurement; acquiring uplink synchronization for the one or more candidate cells by performing an uplink synchronization management procedure for the one or more candidate cells based on the configuration information of the one or more candidate cells; reporting a result of the L1 measurement to a distributed unit (DU) of the base station; receiving, from the DU of the base station, information on a target cell, being the target cell to switch among the one or more candidate cells, based on the result of the L1 measurement; and applying the uplink synchronization acquired through the uplink synchronization management procedure to the target cell.

The method may further comprise: accessing the target cell; and in response to completion of accessing the target cell, transmitting a cell switching complete message to the target cell.

The acquiring of the uplink synchronization for the one or more candidate cells may comprise: determining whether uplink synchronization management is configured for the one or more candidate cells based on the configuration information of the one or more candidate cells; in response to determining that the uplink synchronization management is configured, determining whether an uplink synchronization validity timer has expired for the one or more candidate cells; in response to determining that the uplink synchronization validity timer has expired for the one or more candidate cells, performing the uplink synchronization management procedure for the one or more candidate cells; and acquiring the uplink synchronization for the one or more candidate cells through the uplink synchronization management procedure.

The configuration information of the one or more candidate cells may include configuration information of preambles for random access, and the performing of the uplink synchronization management procedure for the one or more candidate cells in response to determining that the uplink synchronization validity timer has expired for the one or more candidate cells may comprise: in response to determining that the uplink synchronization validity timer has expired for the one or more candidate cells, selecting a preamble from among the preambles for random access; transmitting the selected preamble to the one or more candidate cells; and receiving a random access response (RAR) including a timing advance command for the uplink synchronization from the one or more candidate cells.

The configuration information of the one or more candidate cells may include information on a time division multiplexing (TDM) pattern, and the terminal may transmit the preamble to a corresponding candidate cell at an uplink allocation time for the uplink synchronization management procedure according to the TDM pattern, and receive an RAR at a downlink allocation time for the uplink synchronization management procedure according to the TDM pattern.

The method may further comprise, after the determining of whether the uplink synchronization validity timer has expired for the one or more candidate cells, determining whether a condition to perform uplink synchronization management is satisfied for the one or more candidate cells, wherein when the condition to preform uplink synchronization management is satisfied, the uplink synchronization management procedure for the one or more candidate cells may be performed.

The condition to perform uplink synchronization management may be at least one of a strength-specific condition, a location-specific condition, a time-specific condition, a strength prediction-specific condition, a location prediction-specific condition, or a time prediction-specific condition.

According to a second exemplary embodiment of the present disclosure, a terminal may comprise a processor, and the processor may cause the terminal to perform: receiving, from a centralized unit (CU) of a base station, configuration information of one or more candidate cells and configuration information for measurement; performing layer 1 (L1) measurement on the one or more candidate cells based on the configuration information for measurement; acquiring uplink synchronization for the one or more candidate cells by performing an uplink synchronization management procedure for the one or more candidate cells based on the configuration information of the one or more candidate cells; reporting a result of the L1 measurement to a distributed unit (DU) of the base station; receiving, from the DU of the base station, information on a target cell, being the target cell to switch among the one or more candidate cells, based on the result of the L1 measurement; and applying the uplink synchronization acquired through the uplink synchronization management procedure to the target cell.

The processor may further cause the terminal to perform: accessing the target cell; and in response to completion of accessing the target cell, transmitting a cell switching complete message to the target cell.

In the acquiring of the uplink synchronization for the one or more candidate cells, the processor may further cause the terminal to perform: determining whether uplink synchronization management is configured for the one or more candidate cells based on the configuration information of the one or more candidate cells; in response to determining that the uplink synchronization management is configured, determining whether an uplink synchronization validity timer has expired for the one or more candidate cells; in response to determining that the uplink synchronization validity timer has expired for the one or more candidate cells, performing the uplink synchronization management procedure for the one or more candidate cells; and acquiring the uplink synchronization for the one or more candidate cells through the uplink synchronization management procedure.

The configuration information of the one or more candidate cells may include configuration information of preambles for random access, and in the performing of the uplink synchronization management procedure for the one or more candidate cells in response to determining that the uplink synchronization validity timer has expired for the one or more candidate cells, the processor may further cause the terminal to perform: in response to determining that the uplink synchronization validity timer has expired for the one or more candidate cells, selecting a preamble from among the preambles for random access; transmitting the selected preamble to the one or more candidate cells; and receiving a random access response (RAR) including a timing advance command for the uplink synchronization from the one or more candidate cells.

The processor may further cause the terminal to perform, after the determining of whether the uplink synchronization validity timer has expired for the one or more candidate cells, determining whether a condition to perform uplink synchronization management is satisfied for the one or more candidate cells, wherein when the condition to perform uplink synchronization management is satisfied, the uplink synchronization management procedure for the one or more candidate cells may be performed.

According to the present disclosure, the terminal may perform a random access procedure before performing a handover to a target cell. Accordingly, the terminal may acquire uplink synchronization in advance to reduce an interruption time in all handover scenarios. In addition, the terminal may maintain a connection with a source cell during the handover, and disconnect from the source cell after accessing the target cell to reduce the interruption time. Further, complexity of the terminal may be reduced by allowing the terminal to receive data from the source cell or target cell.

BRIEF DESCRIPTION OF DRAWINGS

FIG. 2 is a block diagram illustrating a first exemplary embodiment of a communication node constituting a communication system.

DETAILED DESCRIPTION OF THE EMBODIMENTS

Figure 1:
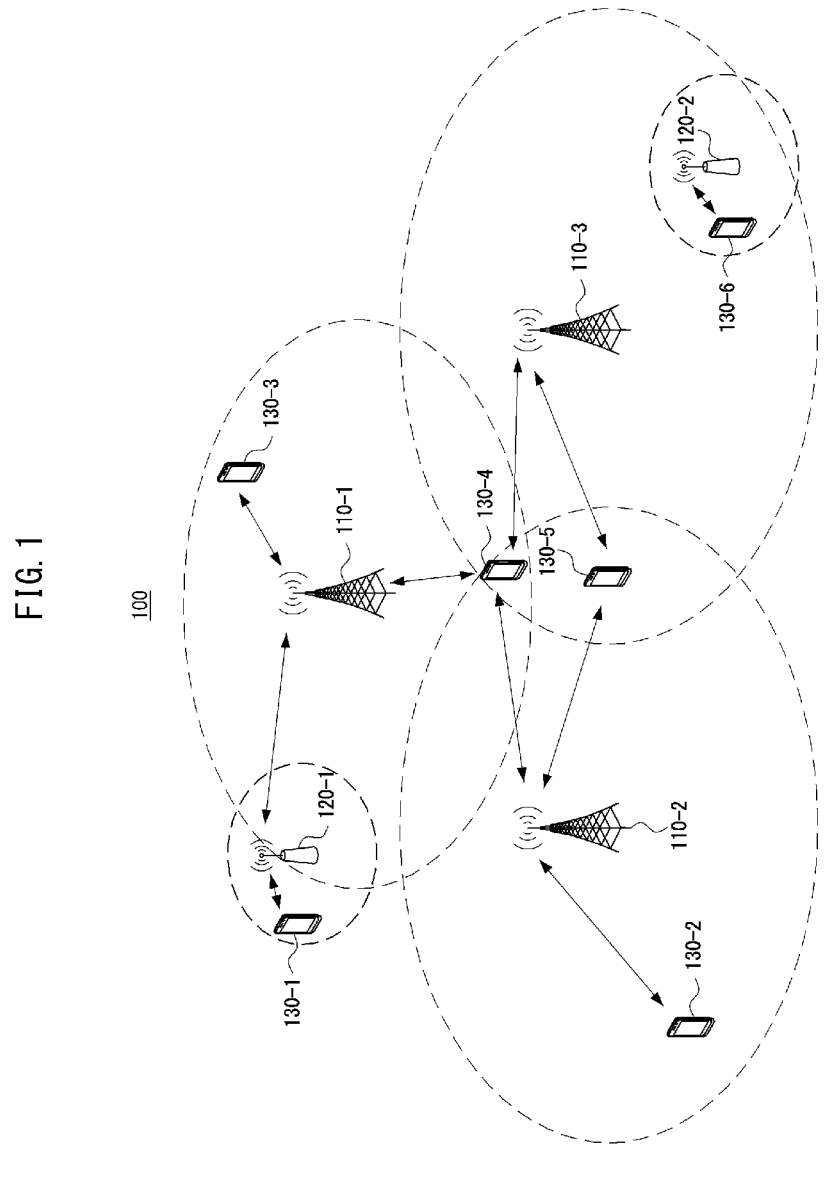
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
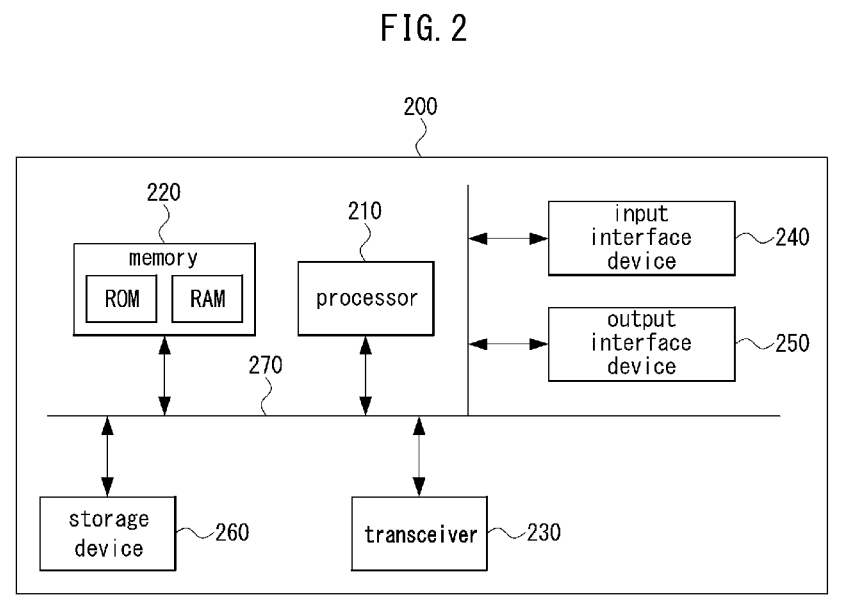

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), New radio (NR), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Meanwhile, in the communication system, the terminal may move from a source cell to a target cell, and perform a handover from the source cell to the target cell. In this case, the terminal may connect to the target cell after disconnecting from the source cell. As described above, if the terminal connects to the target cell after a certain period of time after being disconnected from the source cell, it may not be able to receive data. A time during which the terminal cannot receive data as described above may be referred to as an interruption time.

In this regard, the terminal may maintain a connection with the source cell during the handover to reduce the interruption time. In addition, the terminal may disconnect from the source cell after completing the handover to the target cell. This type of handover scheme may be referred to as a dual active protocol stack (DAPS) handover technique and may be a technique according to the LTE and NR standards. The DAPS handover technique allows the terminal to simultaneously receive data from the source cell and target cell during the handover, resulting in an interruption time of approximately 0 ms. However, according to the DAPS handover technique, the terminal needs to operate a DAPS PDCP entity for the two cells, and operate RLC/MAC/PHY entities for each of the two cells to simultaneously receive and process data from the source cell and the target cell. Accordingly, complexity of the terminal may increase.

Meanwhile, in order to reduce the interruption time, a Make-Before-Break (MBB) handover technique has been adopted in the LTE standard. The MBB handover technique may be a technique that reduces a data interruption time by maintaining a connection with the source cell until the terminal receives a handover command message and performs a random access procedure to the target cell. In the MBB handover technique, the source base station may stop transmitting data to the terminal. Accordingly, if a time point of forwarding the data to the target base station and a time point of disconnecting the terminal from the source cell are similar, the interruption time may be reduced. On the other hand, if the two time points are significantly different, the interruption time may not be reduced. In the MBB handover technique, the terminal may autonomously determine a time point at which the terminal disconnects from the source cell. Therefore, the source cell may not know exactly when the terminal disconnects. As a result, an actual interruption time may be larger than a theoretical interruption time.

Meanwhile, a RACH-less handover technique, which omits a random access (RA) procedure, may be a technique according to the LTE standard for reducing the interruption time. The RACH-less handover technique may be a technique that reduces the interruption time by a time required for the RA procedure omitted when the terminal performs the handover to the target cell. In general, the terminal may acquire uplink synchronization through the RA procedure. Therefore, in a scenario where uplink synchronization acquisition is possible without the RA procedure, the handover that omits the RA procedure may be used. As a result, the handover technique, in which the RA procedure is omitted, may be used limitedly in a handover scenario where a timing advance value is the same in the source cell and the target cell and in a handover scenario where a timing advance value is 0.

In order to solve the above-described problems, exemplary embodiments of the present disclosure allow the terminal to perform an RA procedure before a handover to the target cell. Accordingly, the terminal may acquire uplink synchronization in advance to reduce an interruption time in all handover scenarios. In addition, the terminal may maintain a connection with the source cell during the handover, and disconnect from the source cell after connecting to the target cell to reduce the interruption time. However, complexity of the terminal may be reduced by allowing the terminal to receive data from the source cell or the target cell.

Figure 3:
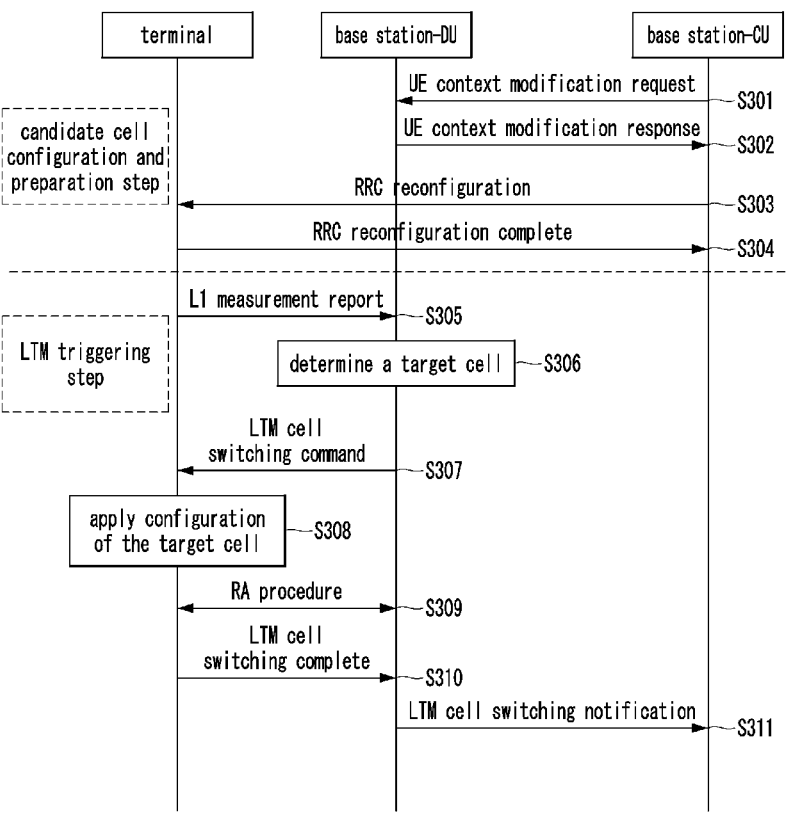
FIG. 3 is a sequence chart illustrating a first exemplary embodiment of a method for inter-cell handover within the same distributed unit (DU) of the same centralized unit (CU), to which layer 1 (L1)/layer 2 (L2)-triggered mobility (LTM) is applied.

FIG. 3 is a sequence chart illustrating a first exemplary embodiment of a method for inter-cell handover within the same distributed unit (DU) of the same centralized unit (CU), to which layer 1 (L1)/layer 2 (L2)-triggered mobility (LTM) is applied.

Referring to FIG. 3, a CU of a base station may generate a UE context modification request message including configuration information of LTM candidate cells (i.e., LTM candidate cell configuration information), and transmit it to a DU of the base station (S301). Then, the DU of the base station may receive the UE context modification request message including the LTM candidate cell configuration information from the CU. Then, the DU may transmit a UE context modification response message to the CU (S302). The UE context modification response message may include configuration information of configured candidate cells, and the like. Accordingly, the CU may receive the UE context modification response message from the DU. Through the steps S301 to S302, the CU and DU of the base station may prepare the candidate cells for the terminal.

Meanwhile, the CU may generate a radio resource control (RRC) reconfiguration message including configuration information of selected candidate cells and L1 measurement configuration information, and transmit it to the terminal (S303). Then, the terminal may receive the RRC reconfiguration message from the CU, and obtain the configuration information of selected candidate cells and the L1 measurement configuration information. Thereafter, the terminal may generate an RRC reconfiguration complete message and transmit it to the CU (S304). Then, the CU may receive the RRC reconfiguration complete message from the terminal. As described above, through the steps S301 to S304, the terminal may perform a candidate cell configuration and preparation step.

Thereafter, the terminal may perform L1 measurement on the configured candidate cells and transmit a result of the L1 measurement to the DU as an L1 measurement report (S305). Then, the DU may receive the L1 measurement report from the terminal, and the DU may determine a target cell, which is a candidate cell to which the terminal is to switch, based on the L1 measurement report (S306). Therefore, in order to inform the terminal of the target cell, which is a candidate cell to which the terminal is to switch, the DU may generate an LTM cell switching command message including an identifier (ID) of the candidate cell determined as the target cell, and transmit it to the terminal (S307).

Accordingly, the terminal may receive the LTM cell switching command message including the ID of the candidate cell determined as the target cell from the DU. Through the steps S305 to S307, the terminal may perform an LTM triggering step.

Thereafter, the terminal may apply the preconfigured configuration information of the candidate cell based on the identifier of the candidate cell determined as the target cell. That is, the terminal may apply the configuration of the target cell (S308). Then, the terminal may acquire uplink synchronization by performing an RA procedure with the DU while using the candidate cell as the target cell (S309). Meanwhile, when the terminal is normally connected to the target cell, the terminal may transmit an LTM cell switching complete message to the DU (S310). Then, the DU may receive the LTM cell switching complete message from the terminal indicating that the connection to the target cell has been completed normally. In addition, the DU may generate an LTM cell switching notification message including the identifier of the target cell, and transmit it to the CU (S311). Accordingly, the CU may receive the LTM cell switching notification message including the ID of the target cell from the DU. Accordingly, the CU may start data transmission to the terminal based on the ID of the target cell included in the notification message.

Figure 4:
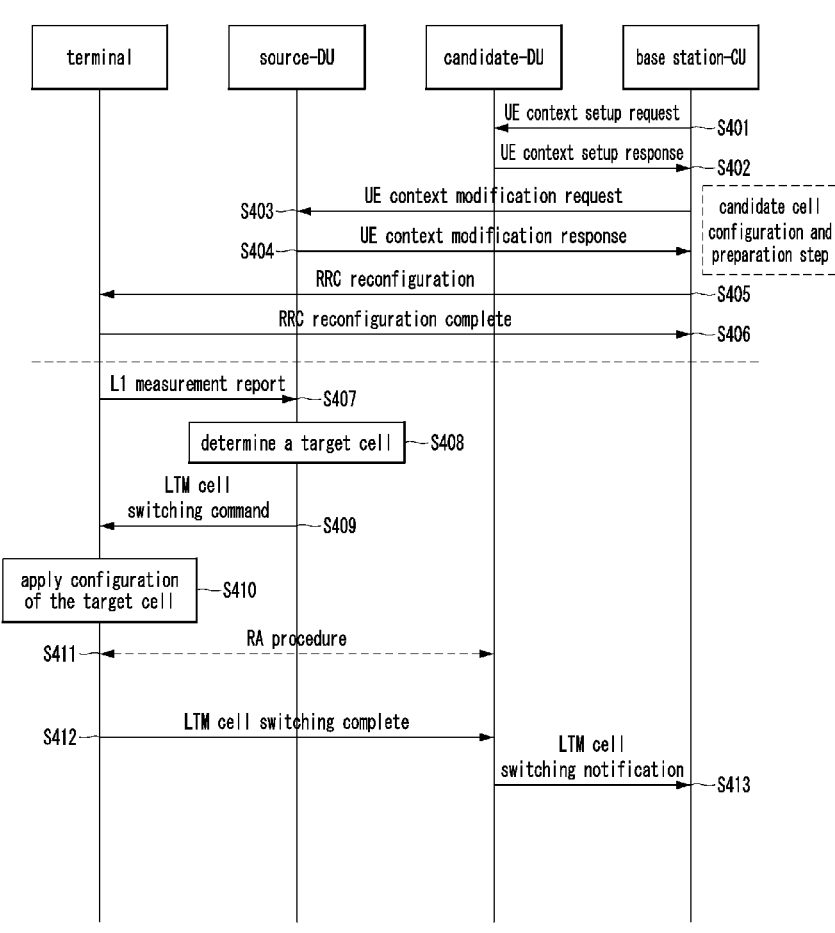
FIG. 4 is a sequence chart illustrating a first exemplary embodiment of a method for inter-cell handover within different DUs of the same CU, to which LTM is applied.

FIG. 4 is a sequence chart illustrating a first exemplary embodiment of a method for inter-cell handover within different DUs of the same CU, to which LTM is applied.

Referring to FIG. 4, a CU of a base station may generate a UE context setup request message including LTM configuration information, and transmit it to a candidate-DU of the base station (S401). Then, the candidate-DU of the base station may receive the UE context setup request message including the LTM configuration information from the CU. In addition, the candidate-DU of the base station may generate a UE context setup response message, and transmit it to the CU of the base station (S402). The UE context setup response message may include configuration information of LTM candidate cells, and the like. Accordingly, the CU of the base station may receive the UE context setup response message from the candidate-DU of the base station.

The CU of the base station may generate a UE context modification request message including configuration information of candidate cells, and transmit it to a source-DU of the base station (S403). Then, the source-DU of the base station may receive the UE context modification request message including the configuration information of candidate cells from the CU, and the source-DU of the base station may transmit a UE context modification response message to the CU (S404). The UE context modification response message may include configuration information of configured candidate cells, and the like. Accordingly, the CU may receive the UE context modification response message from the source-DU of the base station. Through the steps S401 to S404, the CU of the base station, source-DU of the base station, and candidate-DU of the base station may prepare candidate cells for the terminal.

Meanwhile, the CU may generate an RRC reconfiguration message including configuration information of selected candidate cells and L1 measurement configuration information, and transmit it to the terminal (405). Then, the terminal may receive the RRC reconfiguration message from the CU and obtain the configuration information of selected candidate cells and the L1 measurement configuration information. Thereafter, the terminal may generate an RRC reconfiguration complete message and transmit it to the CU (S406). Then, the CU may receive the RRC reconfiguration complete message from the terminal. Through the steps S401 to S406, the terminal may perform a candidate cell configuration and preparation step.

Thereafter, the terminal may perform L1 measurement on the configured candidate cells, and transmit a result of the L1 measurement to the source-DU of the base station as an L1 measurement report (S407). Then, the source-DU of the base station may receive the L1 measurement report from the terminal, and the source-DU of the base station may determine a target cell, which is a candidate cell to which the terminal is to switch, based on the L1 measurement report (S408). Therefore, the source-DU of the base station may generate an LTM cell switching command message including an ID of the candidate cell determined as the target cell to inform the terminal of the target cell, which is a candidate cell to which the terminal is to switch, and transmit it to the terminal (S409). Accordingly, the terminal may receive the LTM cell switching command message including the ID of the candidate cell determined as the target cell from the source-DU of the base station. Through the steps S407 to S409, the terminal may perform an LTM triggering step.

Thereafter, the terminal may apply the preconfigured configuration information of the candidate cell based on the ID of the candidate cell determined as the target cell (S410). Then, the terminal may acquire uplink synchronization by performing an RA procedure with the candidate-DU of the base station while using the corresponding candidate cell as the target cell (S411).

Meanwhile, when the terminal is normally connected to the target cell, the terminal may transmit an LTM cell switching complete message to the candidate-DU of the base station (S412), and the candidate-DU of the base station may receive the LTM cell switching complete message from the terminal indicating that the connection to the target cell has been completed normally. In addition, the candidate-DU of the base station may generate an LTM cell switching notification message including the ID of the target cell, and transmit it to the CU (S413). Accordingly, the CU may receive the LTM cell switching notification message including the ID of the target cell from the DU. Accordingly, the CU may start data transmission to the terminal based on the ID of the target cell included in the notification message.

Figure 5:
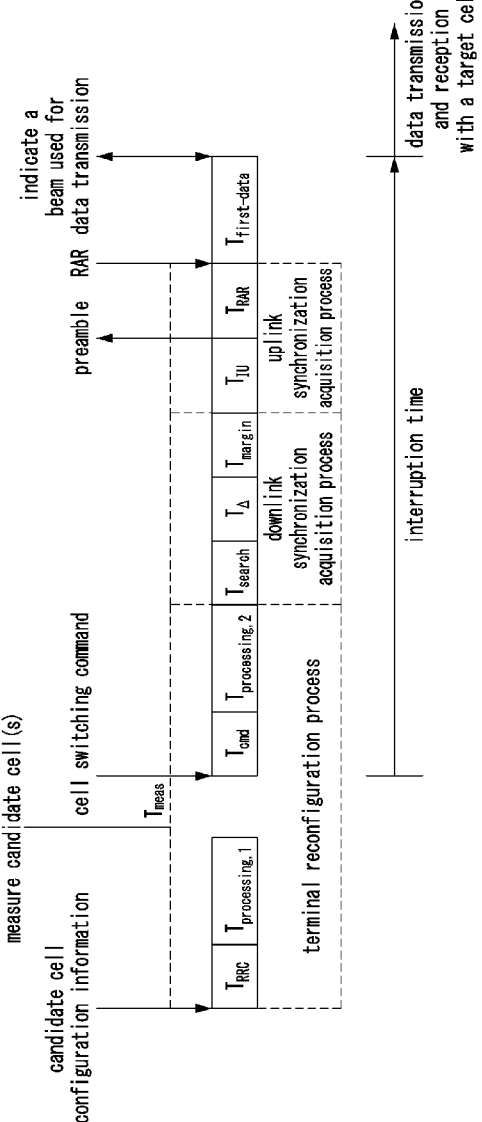
FIG. 5 is a conceptual diagram illustrating a first exemplary embodiment of an interruption time in LTM.

FIG. 5 is a conceptual diagram illustrating a first exemplary embodiment of an interruption time in LTM.

Referring to FIG. 5, the terminal receiving the RRC reconfiguration message from the CU may obtain and store configuration information of candidate cells from the RRC reconfiguration message. A time required for this process may be defined as $T_{RRC}$. In this case, the terminal may process configuration information of necessary candidate cells before receiving a cell switching command message from the DU. A time required for this process may be defined as $T_{processing,1}$. Through the above-described process, the terminal may reduce an interruption time.

Meanwhile, as a candidate cell appears, the terminal may perform L1 measurement on the candidate cell according to the L1 measurement configuration information. A time required for this process may be defined as $T_{meas}$. The terminal may receive data from the source cell until it receives the cell switching command message from the DU. Accordingly, such time may not be included in the interruption time.

The terminal receiving the cell switching command message from the DU may process the message and configure the candidate cell as a target cell. A time required for this process may be defined as $T_{cmd}$. Thereafter, the terminal may process configuration information of the candidate cell corresponding to the target cell, and perform a preparation operation to access the target cell. A time required for this process may be defined as $T_{processing,2}$. The process from a time point when the terminal obtains the candidate cell configuration information to a time point when the terminal performs the preparation operation to access the target cell may be referred to as 'terminal reconfiguration process'.

Thereafter, the terminal may acquire downlink synchronization to access the target cell. A time required for this process may be defined as $T_{DL}$. $T_{DL}$ may include a time $T_{search}$ required to search for the target cell, a time $T_A$ required for fine acquisition and tracking of the entire timing information, and a pre-processing time $T_{margin}$ of synchronization signal block (SSB). Here, the time $T_A$ required for fine acquisition and tracking of the entire timing information may correspond to a synchronization signal (SS)/physical broadcast channel (PBCH) block measurement timing configuration (SMTC) periodicity (typically 20 ms).

Meanwhile, after acquiring downlink synchronization, the terminal may acquire uplink synchronization by performing an RA procedure with the target cell. A time required for this process may be defined as $T_{UL}$. $T_{UL}$ may include $T_{IU}$ and $T_{RAR}$. Here, $T_{IU}$ may be an interruption time until the terminal obtains a first available physical random access channel (PRACH) occasion in the target cell. $T_{RAR}$ may be a delay time required for the terminal to receive a random access response after transmitting a preamble. As described above, the terminal may acquire uplink synchronization and access the target cell. Then, the DU may determine an optimal beam and indicate to the terminal which beam to use for transmitting and receiving data. Accordingly, the terminal may receive information indicating the optimal beam from the DU, and transmit and receive data with DU through the beam. In this case, a time required for the terminal to receive information indicating the beam to be used for data transmission after receiving the random access response may be defined as $T_{first-data}$. Therefore, the interruption time may be defined as a time from $T_{cmd}$ to $T_{first-data}$.

Table 1 below shows each component, meaning, and generally required time thereof for a handover interruption time when LTM is applied.

TABLE 1

| Components | Meaning | Value |
|---|---|---|
| $T_{RRC}$ | A processing time of the RRC reconfiguration message including candidate cell configuration information | ≥10 ms |
| $T_{processing,1}$/ $T_{processing,2}$ | A processing time of the terminal before/after receiving the cell switching command. The processing time includes a time required for L2/L3 reconfiguration, radio frequency (RF) retuning, baseband retuning, security update, and the like, | Totally, ≥20 ms |
| $T_{meas}$ | A time required for measurement on candidate cells (from the time point of candidate cell configuration according to the cell switching command) | — |

TABLE 1-continued

| Components | Meaning | Value |
|---|---|---|
| $T_{cmd}$ | L1/L2-based cell switching command processing time | ≥20 ms |
| $T_{search}$ | A time required for searching for a target cell | 0 ms (when it is assumed that the cell is known) |
| $T_\Delta$ | A time required for fine acquisition and tracking of the entire timing information | SMTC periodicity (typically, 20 ms) |
| $T_{margin}$ | SSB pre-processing time | ≥2 ms |
| $T_{IU}$ | An interruption time until the first available PRACH is obtained in the target cell | Typically, 15 ms |
| $T_{RAR}$ | A delay time required for receiving a random access response after the terminal transmits a preamble | Typically, 4 ms |

Meanwhile, the terminal receiving the cell switching command message from the DU may process the cell switching command message, and configure the candidate cell as the target cell. In this case, the time required for the terminal to process the cell switching command message may be eliminated when the terminal determines cell switching. Accordingly, the communication system may allow the terminal to determine cell switching. In this case, the terminal may not be able to consider a resource status of the network. As a result, the interruption time may become greater due to a delay that occurs in delivering data to the corresponding DU.

In addition, the terminal may receive the cell switching command message from the DU, and configure the corresponding candidate cell as the target cell. Thereafter, the terminal may process configuration information of the candidate cell corresponding to the target cell, and perform a preparation operation to access the target cell. A time required for the preparation operation may be eliminated if the terminal can connect to the source cell and simultaneously perform configuration of the target cell during communication with the source cell. In the above-described case, the complexity of the terminal may increase and hardware and software costs thereof may increase.

The terminal may acquire downlink synchronization to access the target cell after performing the preparation operation. A time required to acquire downlink synchronization as described above may be eliminated by acquiring downlink synchronization in advance before accessing the target cell.

After acquiring downlink synchronization, the terminal may acquire uplink synchronization by performing an RA procedure with the target cell. A time required to acquire uplink synchronization may be eliminated when uplink synchronization is acquire in advance before accessing the target cell or when uplink synchronization can be omitted.

The terminal may access the target cell. Thereafter, the DU may determine an optimal beam and indicate it to the terminal. Accordingly, the terminal may transmit and receive data through the corresponding beam. A time required for this process may be eliminated if downlink synchronization can be acquired, uplink synchronization can be acquired, and the indication of the optimal beam can be received in advance before accessing the target cell.

As described above, the interruption time may be significantly eliminated when the terminal can acquire downlink synchronization, acquire uplink synchronization, and receive an indication on the optimal beam in advance before accessing the target cell to perform cell switching. Accordingly, the present disclosure proposes a method that allows the terminal to acquire downlink synchronization, acquire uplink synchronization, and receive an indication on the optimal beam in advance before accessing the target cell to perform cell switching in L1/L2 triggered mobility. The above-described method may be referred to as 'candidate cell uplink synchronization management method'.

Figure 6:
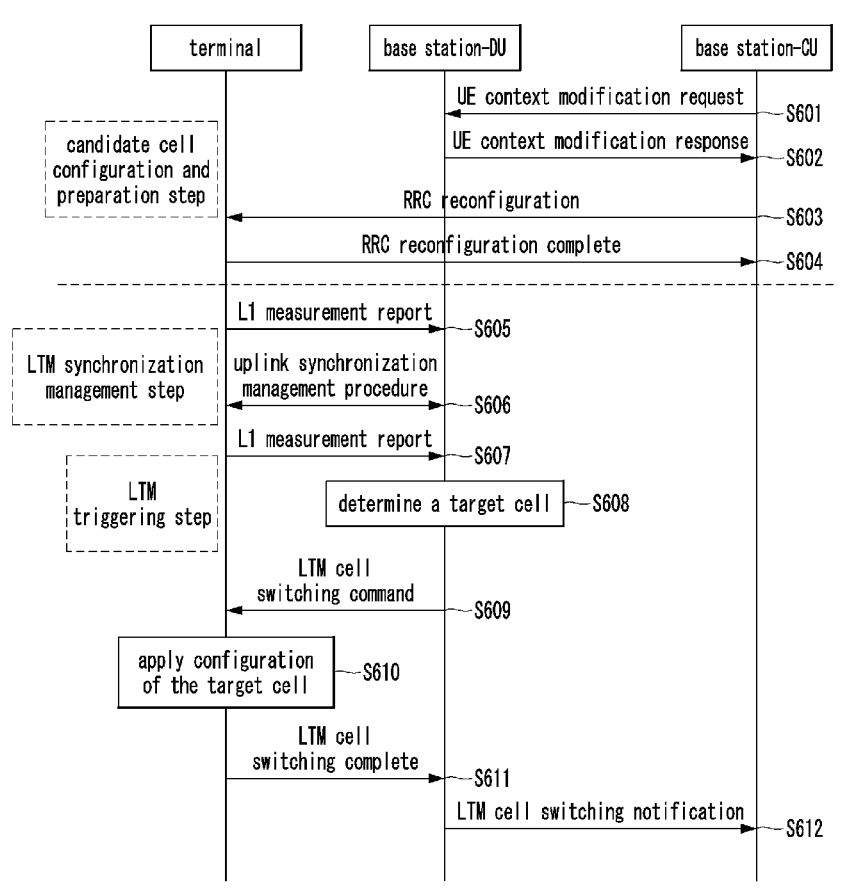
FIG. 6 is a sequence chart illustrating a second exemplary embodiment of a method for inter-cell handover within the same DU of the same CU, to which LTM is applied.

FIG. 6 is a sequence chart illustrating a second exemplary embodiment of a method for inter-cell handover within the same DU of the same CU, to which LTM is applied.

Referring to FIG. 6, a CU of a base station may generate a UE context modification request message including configuration information of LTM candidate cells (i.e., candidate cell configuration information), and transmit it to a DU of the base station (S601). Then, the DU of the base station may receive the UE context modification request message including the configuration information of LTM candidate cells from the CU, and the DU may transmit a UE context modification response message to the CU (S602). The UE context modification response message may include configuration information of configured candidate cells, and the like. Accordingly, the CU may receive the UE context modification response message from the DU. Through the steps S601 to S602, the CU and DU of the base station may prepare candidate cells for the terminal.

Meanwhile, the CU may generate an RRC reconfiguration message including configuration information of selected candidate cells and L1 measurement configuration information, and transmit it to the terminal (S603). Then, the terminal may receive the RRC reconfiguration message from the CU, and obtain the configuration information for candidate cells and the L1 measurement configuration information. Thereafter, the terminal may generate an RRC reconfiguration complete message, and transmit it to the CU (S604), and the CU may receive the RRC reconfiguration complete message from the terminal. Through the steps S601 to S604, the terminal may perform a candidate cell configuration and preparation step.

Thereafter, the terminal may perform L1 measurement on the configured candidate cells. Then, the terminal may perform a candidate cell uplink synchronization management procedure according to candidate cell uplink synchronization management configuration information included in the candidate cell configuration information. As an example, the candidate cell uplink synchronization management configuration information included in the candidate cell configuration information may be configured so that the terminal reports an L1 measurement result. In this case, the terminal may transmit the L1 measurement result for the candidate cell uplink synchronization management procedure to the DU as an L1 measurement report before performing the candidate cell uplink synchronization management procedure (S605). Then, the DU may receive the L1 measurement report from the terminal. Thereafter, the terminal and the DU may perform the candidate cell uplink synchronization management procedure (S606). Through the candidate cell uplink synchronization management procedure, the terminal may acquire downlink synchronization, acquire uplink synchronization, and receive an indication of an optimal beam in advance before accessing the target cell, in order to perform cell switching. Through the steps S605 and S606, the terminal may perform the step for the uplink synchronization management procedure to which LTM is applied (i.e., LTM synchronization management step).

Thereafter, the terminal may perform L1 measurement on the configured candidate cells, and transmit an L1 measurement report for a cell switching procedure to the DU (S607). The DU may determine a target cell, which is a candidate cell to which the terminal is to switch, based on the L1 measurement report (S608). Therefore, the DU may generate an LTM cell switching command message including an ID of the candidate cell determined as the target cell to inform the terminal of the target cell, which is a candidate cell to which the terminal is to switch, and transmit it to the terminal (S609).

Accordingly, the terminal may receive the LTM cell switching command message including the ID of the candidate cell determined as the target cell from the DU. Through the steps 607 to S609, the terminal may perform an LTM triggering step.

Therefore, the terminal may apply the preconfigured configuration information of the candidate cell based on the ID of the candidate cell determined as the target cell. That is, the terminal may apply configuration of the target cell (S610). In addition, the terminal may apply the uplink synchronization acquired in advance through the candidate uplink synchronization management procedure using the candidate cell, to which the terminal is to switch, as the target cell. Meanwhile, when the terminal is normally connected to the target cell, the terminal may generate an LTM cell switching complete message, and transmit it to the DU (S611). Then, the DU may receive the LTM cell switching complete message from the terminal indicating that the connection to the target cell has been completed normally. In addition, the DU may generate an LTM cell switching notification message including the ID of the target cell, and transmit it to the CU (S612). Accordingly, the CU may receive the LTM cell switching notification message including the ID of the target cell ID from the DU. Accordingly, the CU may start data transmission to the terminal based on the ID of the target cell included in the notification message.

Figure 7:
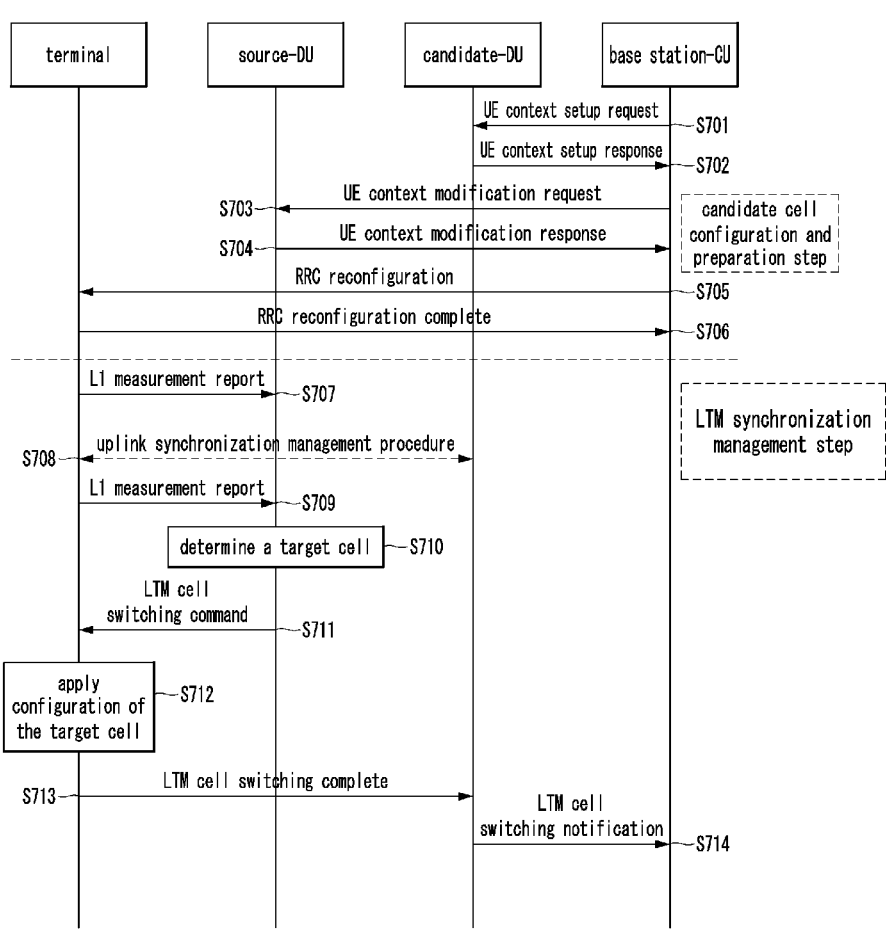
FIG. 7 is a sequence chart illustrating a second exemplary embodiment of a method for inter-cell handover within different DUs of the same CU, to which LTM is applied.

FIG. 7 is a sequence chart illustrating a second exemplary embodiment of a method for inter-cell handover within different DUs of the same CU, to which LTM is applied.

Referring to FIG. 7, a CU of a base station may generate a UE context setup request message including LTM configuration information, and transmit it to a candidate-DU of the base station (S701). Then, the candidate-DU of the base station may receive the UE context setup request message including the LTM configuration information from the CU. Then, the candidate-DU of the base station may generate a UE context setup response message, and transmit it to the CU of the base station (S702). The UE context setup response message may include configuration information of LTM candidate cells, and the like. Accordingly, the CU of the base station may receive the UE context setup response message from the candidate-DU of the base station.

The CU of the base station may generate a UE context modification request message including configuration information of candidate cells, and transmit it to a source-DU of the base station (S703). Then, the source-DU of the base station may receive the UE context modification request message including the configuration information of candidate cells from the DU, and the source-DU of the base station may transmit a UE context modification response message to the CU (S704). The UE context modification response message may include configuration information of configured candidate cells, and the like. Accordingly, the CU may receive the UE context modification response message from the source-DU of the base station. Through the steps S701 to S704, the CU of the base station, the source-DU of the base station, and the candidate-DU of the base station may prepare candidate cells for the terminal.

Meanwhile, the CU may generate an RRC reconfiguration message including configuration information for selected candidate cells and L1 measurement configuration information, and transmit it to the terminal (705). Then, the terminal may receive the RRC reconfiguration message from the CU, and obtain the configuration information for candidate cells and the L1 measurement configuration information. Thereafter, the terminal may generate an RRC reconfiguration complete message, and transmit it to the CU (S706). Then, the CU may receive the RRC reconfiguration complete message from the terminal. Through the steps S701 to S706, the terminal may perform a candidate cell configuration and preparation step.

Thereafter, the terminal may perform L1 measurement on the configured candidate cells, and transmit a result of the L1 measurement to the source-DU of the base station as an L1 measurement report (S707). Then, the source-DU of the base station may receive the L1 measurement report from the terminal. Then, the terminal and the candidate-DU of the base station may perform a candidate cell uplink synchronization management procedure (S708). Through the candidate cell uplink synchronization management procedure, the terminal may acquire downlink synchronization, acquire uplink synchronization, and receive an indication of an optimal beam in advance before accessing the target cell to perform cell switching. Through the steps S707 and S708, the terminal may perform the step for the uplink synchronization management procedure to which LTM is applied (i.e., LTM synchronization management step).

Thereafter, the terminal may perform L1 measurement on a plurality of selected candidate cells, and transmit a result of the L1 measurement to the source-DU of the base station as an L1 measurement report (S709). Then, the source-DU of the base station may receive the L1 measurement report from the terminal. The source-DU of the base station may determine a target cell, which is a candidate cell to which the terminal is to switch, based on the L1 measurement report (S710). Therefore, the source-DU of the base station may generate an LTM cell switching command message including an ID of the candidate cell determined as the target cell to the terminal to inform the terminal of the target cell, which is a candidate cell to which the terminal is to switch (S711). Accordingly, the terminal may receive the LTM cell switching command message including the ID of the candidate cell determined as the target cell from the source-DU of the base station. Through the steps S709 to S711, the terminal may perform an LTM triggering step.

Thereafter, the terminal may apply the preconfigured configuration information of the candidate cell based on the ID of the candidate cell determined as the target cell (S712). In addition, the terminal may acquire uplink synchronization by performing an RA procedure with the candidate-DU of the base station while using the corresponding candidate cell as the target cell.

Meanwhile, when the terminal is normally connected to the target cell, the terminal may transmit an LTM cell switching complete message to the candidate-DU of the base station (S713). Then, the candidate-DU of the base station may receive the LTM cell switching complete message from the terminal indicating that the connection to the target cell has been completed normally. In addition, the candidate-DU of the base station may generate an LTM cell switching notification message including the ID of the target cell, and transmit it to the CU (S714). Accordingly, the CU may receive the LTM cell switching notification message including the ID of the target cell ID from the DU. Accordingly, the CU may start data transmission to the terminal based on the ID of the target cell included in the notification message.

Figure 8:
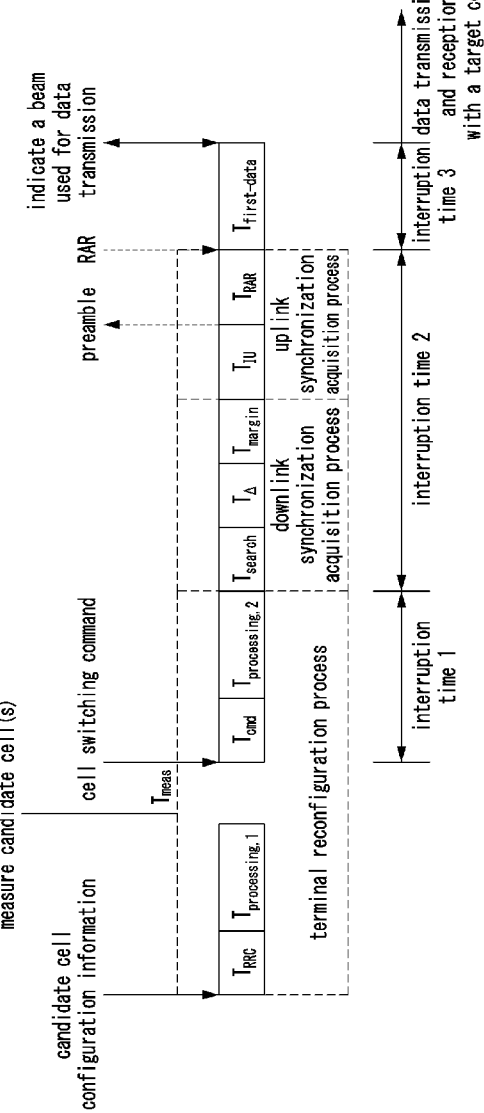
FIG. 8 is a conceptual diagram illustrating a second exemplary embodiment of an interruption time in LTM.

FIG. 8 is a conceptual diagram illustrating a second exemplary embodiment of an interruption time in LTM.

Referring to FIG. 8, the terminal receiving the RRC reconfiguration message from the CU may obtain and store configuration information of candidate cells from the RRC reconfiguration message. A time required for this process may be defined as $T_{RRC}$. In this case, the terminal may process configuration information of necessary candidate cells before receiving a cell switching command message from the DU. A time required for this process may be defined as $T_{processing,1}$. Through the above-described process, the terminal may reduce an interruption time.

Meanwhile, as a candidate cell appears, the terminal may perform L1 measurement on the candidate cell according to the L1 measurement configuration information. A time required for this process may be defined as $T_{meas}$. The terminal may receive data from the source cell until it receives a cell switching command message from the DU. Accordingly, such time may not be included in the interruption time.

The terminal receiving the cell switching command message from the DU may process the message and configure the candidate cell as a target cell. A time required for this process may be defined as $T_{cmd}$. Thereafter, the terminal may process configuration information of the candidate cell corresponding to the target cell, and perform a preparation operation to access the target cell. A time required for this process may be defined as $T_{processing,2}$. The process from a time point when the terminal acquires configuration information of candidate cells to a time point when the terminal performs the preparation operation to access the target cell may be referred to as 'terminal reconfiguration process'. Here, a sum of $T_{cmd}$ and $T_{processing,2}$ may be an interruption time 1. The interruption time 1 may be an interruption time that cannot be eliminated considering terminal configuration complexity and cost issues.

Thereafter, the terminal may acquire downlink synchronization to access the target cell. A time required for this process may be defined as $T_{DL}$. $T_{DL}$ may include a time $T_{search}$ required to search for the target cell, a time $T_A$ required for fine acquisition and tracking of the entire timing information, and a pre-processing time $T_{margin}$ of SSB. Here, $T_{DL}$ may be eliminated when downlink synchronization is acquired in advance before accessing the target cell. This may be applied by the terminal itself depending on implementation of the terminal. Alternatively, the terminal may apply it when the candidate cell uplink synchronization management configuration information is included in the configuration information of candidate cells.

Meanwhile, after acquiring downlink synchronization, the terminal may acquire uplink synchronization by performing an RA procedure with the target cell. A time required for this process may be defined as $T_{UL}$. $T_{UL}$ may include $T_{IU}$ and $T_{RAR}$. $T_{UL}$ may be eliminated when uplink synchronization is acquired in advance before accessing the target cell or when uplink synchronization can be omitted. This may be applied when the candidate cell uplink synchronization management configuration information is included in the configuration information of candidate cells. Here, $T_{IU}$ may be an interruption time until the terminal obtains a first available PRACH occasion in the target cell. $T_{RAR}$ may be a delay time required for the terminal to receive a random access response after transmitting a preamble. Here, a sum of $T_{DL}$ and $T_{UL}$ may be an interruption time 2.

As described above, the terminal may acquire uplink synchronization, and access the target cell. Then, the DU may determine an optimal beam, and indicate the terminal which beam to use for transmitting and receiving data. Accordingly, the terminal may receive information indicating the optimal beam from the DU, and transmit and receive data with the DU through the beam. In this case, a time required for the terminal to receive information indicating the beam to be used for data transmission after receiving a random access response may be defined as $T_{first-data}$. Therefore, an interruption time may be defined as the time from $T_{cmd}$ to $T_{first-data}$. The time $T_{first-data}$ may be defined as an interruption time 3. The time $T_{first-data}$ may be eliminated when the indication of the optimal beam is received in advance before accessing the target cell. This may be applied when the target cell DU can receive the L1 measurement report on the candidate cell from the terminal before the terminal accesses the target cell. Therefore, this may be applied when the configuration information of candidate cells includes the candidate cell uplink synchronization management configuration information, and the L1 measurement result for the candidate cell is configured to be reported to the DU.

Therefore, in the handover to which the improved L1/L2 triggered inter-cell mobility is applied, the interruption time may be defined as the interruption time 1 from $T_{cmd}$ to $T_{processing,2}$ in an optimal case. To this end, the terminal may perform a candidate cell uplink synchronization management procedure and a candidate cell L1 measurement reporting procedure. In this case, the terminal may perform only the candidate cell uplink synchronization management procedure. In this case, the total interruption time may be defined as including the interruption time 1 from $T_{cmd}$ to $T_{processing,2}$ and the interruption time 3 of $T_{first-data}$. When only downlink synchronization is acquired in advance without the candidate cell uplink synchronization management procedure, the total interruption time may be defined as the interruption time 1 from $T_{cmd}$ to $T_{processing,2}$, the time $T_{UL}$, and the interruption time 3 of $T_{first-data}$.

Figure 9:
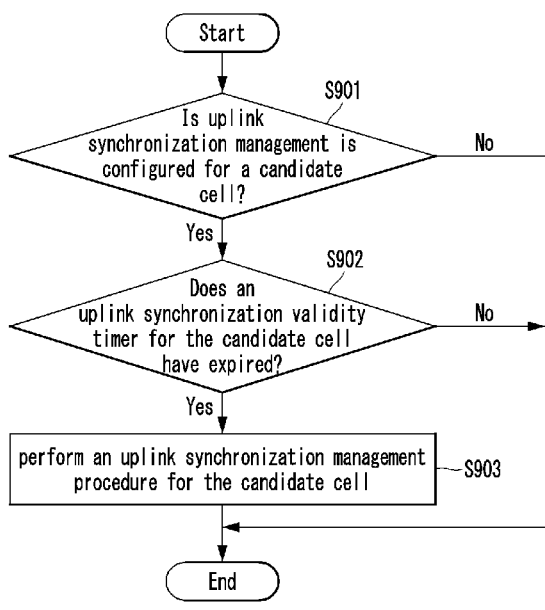
FIG. 9 is a flowchart illustrating a first exemplary embodiment of a synchronization management method in a communication system.

FIG. 9 is a flowchart illustrating a first exemplary embodiment of a synchronization management method in a communication system.

Referring to FIG. 9, in a synchronization management method, a CU of a base station may prepare candidate cells for a terminal. Then, the CU may generate an RRC reconfiguration message including configuration information of selected candidate cells and L1 measurement configuration information, and transmit it to the terminal.

Here, the configuration information of candidate cells may include candidate cell uplink synchronization management configuration information. In addition, the candidate cell uplink synchronization management configuration information may include information on whether candidate cell uplink synchronization management is performed for the corresponding candidate cell. In addition, the candidate cell uplink synchronization management configuration information may include a time alignment timer value for a candidate cell uplink synchronization management procedure. Here, the time alignment timer may be an uplink synchronization validity timer. In addition, the candidate cell uplink synchronization management configuration information may include information on whether to perform an L1 measurement result reporting procedure for the candidate cell uplink synchronization management procedure. In addition, the candidate cell uplink synchronization management configuration information may include information on a contention-free random access resource for the candidate cell uplink synchronization management procedure. In addition, the candidate cell uplink synchronization management configuration information may include a TDM pattern so that the candidate cell uplink synchronization management procedure can be performed while transmitting and receiving data with the source cell.

Then, the terminal may receive the RRC reconfiguration message from the CU, and obtain the configuration information of candidate cells and L1 measurement configuration information. Then, the terminal may perform L1 measurement on the candidate cells, and the terminal may determine whether uplink synchronization management is configured for the candidate cell (S901). As a result of the determination, uplink synchronization management may not have been configured for the candidate cells. In this case, the terminal may terminate the synchronization management method. On the other hand, as a result of the determination, uplink synchronization management may have been configured for the candidate cells. In this case, the terminal may perform the candidate cell uplink synchronization management procedure according to the candidate cell uplink synchronization management configuration information.

To this end, the terminal may determine whether the uplink synchronization validity timer for the corresponding candidate cell has expired (S902). As a result of the determination, the uplink synchronization validity timer for the corresponding candidate cell may have not been expired and may be running. In this case, the terminal may determine that the uplink synchronization for the candidate cell is valid. In this case, the terminal may terminate the synchronization management method. On the other hand, as a result of the determination, the uplink synchronization validity timer for the corresponding candidate cell may have expired and may not be running. In this case, the terminal may determine that the uplink synchronization for the corresponding candidate cell is invalid. The terminal may perform the uplink synchronization management procedure for the corresponding candidate cell (S903).

In the candidate cell uplink synchronization management procedure, the terminal may receive a candidate cell uplink synchronization management response message from the candidate-DU of the base station. In this case, the terminal may start or restart the uplink synchronization validity timer for the corresponding candidate cell. The timer value may be included in the candidate cell uplink synchronization management configuration information. Alternatively, the timer value may be a predetermined value. The candidate cell uplink synchronization management procedure may be similar to a random access procedure that does not include a contention resolution step.

Meanwhile, information on a TDM pattern may be included the in the candidate cell uplink synchronization management configuration information. In this case, the terminal may transmit a random access preamble to the corresponding candidate cell at an uplink allocation time for the candidate cell uplink synchronization management procedure according to the TDM pattern. In addition, the terminal may receive a random access response message at a downlink allocation time for the candidate cell uplink synchronization management procedure according to the TDM pattern.

Figure 10:
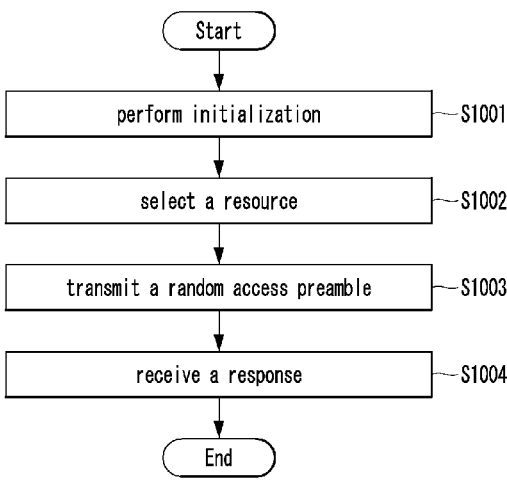
FIG. 10 is a flowchart illustrating a first exemplary embodiment of the candidate cell uplink synchronization management procedure of FIG. 9.

FIG. 10 is a flowchart illustrating a first exemplary embodiment of the candidate cell uplink synchronization management procedure of FIG. 9.

Referring to FIG. 10, in the candidate cell uplink synchronization management procedure, the terminal may perform initialization for the candidate cell uplink synchronization management procedure (S1001). In the initialization step, the terminal may initialize parameters and variables for the candidate cell uplink synchronization management procedure. As an example, the parameters and variables for the uplink synchronization management procedure may be parameters and variables for an RA procedure.

Then, the terminal may select a resource for the candidate cell uplink synchronization management procedure (S1002). Here, the resource for the candidate cell uplink synchronization management procedure may be a preamble allocated for an RA procedure. Accordingly, as an example, the terminal may select a preamble for an RA procedure in the resource selection step S1002. Here, the resource for the candidate cell uplink synchronization management procedure may be a contention-free random access resource included in the candidate cell uplink synchronization management configuration information. Here, the contention-free random access resource may be a contention-free preamble. Accordingly, as an example, in the resource selection step S1002, the terminal may select an allocated contention-free random access resource included in the candidate cell uplink synchronization management configuration information. On the other hand, the resource for the candidate cell uplink synchronization management procedure may be a contention-based random access resource included in the candidate cell uplink synchronization management configuration information. In this case, the contention-based random access resource may be a contention-based preamble. Accordingly, as an example, in the resource selection step S1002, the terminal may select an allocated contention-based random access resource included in the candidate cell uplink synchronization management configuration information.

The terminal may transmit the selected random access preamble to the candidate-DU of the base station for the candidate cell uplink synchronization management procedure (S1003). The random access preamble transmission step S1003 may be similar to a preamble transmission step of an RA procedure. That is, the terminal may transmit the preamble selected in the resource selection step S1002 to the candidate-DU of the base station by using a selected PRACH occasion, random access-radio network temporary identifier (RA-RNTI), preamble index, preamble received target power, and the like.

Accordingly, the candidate-DU of the base station may receive the preamble of the RA procedure from the terminal, and the candidate-DU of the base station may transmit a random access response to the terminal. Accordingly, the terminal may receive the response for the candidate cell uplink synchronization management procedure (S1004). In the response reception step S1004, the terminal may receive a candidate cell uplink synchronization management response message through the RA-RNTI corresponding to the preamble, which is delivered in the preamble transmission step S1003, similarly to a response reception step of an RA procedure. The terminal may successfully receive the candidate cell uplink synchronization management response message. In this case, the terminal may start or restart the uplink synchronization validity timer for the corresponding candidate cell.

Figure 11:
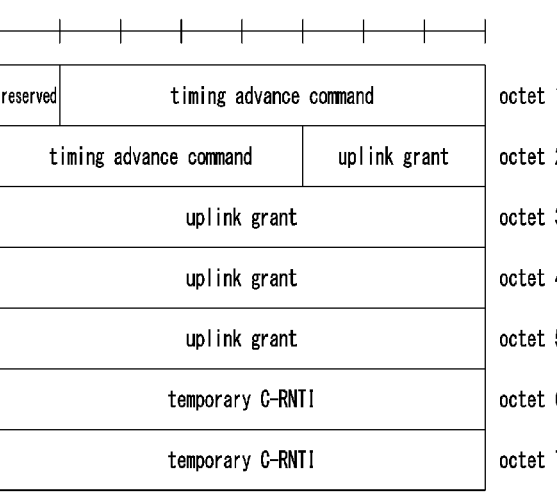
FIG. 11 is a diagram illustrating a first exemplary embodiment of a format of a candidate cell uplink synchronization management response message.

FIG. 11 is a diagram illustrating a first exemplary embodiment of a format of a candidate cell uplink synchronization management response message.

Referring to FIG. 11, a bit 0 of an octet 1 in a candidate cell uplink synchronization management response message may be designated as a reserved bit. In the candidate cell uplink synchronization management response message, bits 1 to 7 of the octet 1 and bits 0 to 4 of an octet 2 may be designated as a timing advance command field for uplink synchronization. In addition, in the candidate cell uplink synchronization management response message, bits 5 to 7 of the octet 2 and octets 3 to 5 may be designated as an uplink grant field including a transmit power control (TPC) command for uplink transmission power control. In addition, octets 6 and 7 in the candidate cell uplink synchronization management response message may be designated as a temporary cell RNTI (C-RNTI) field. The terminal may ignore the temporary C-RNTI if it can obtain the C-RNTI from the candidate cell uplink synchronization management configuration information. Otherwise, the terminal may store the C-RNTI and use the C-RNTI when actually accessing the target cell. For example, the candidate cell uplink synchronization management response message may be the same message as a random access response message.

Figure 12:
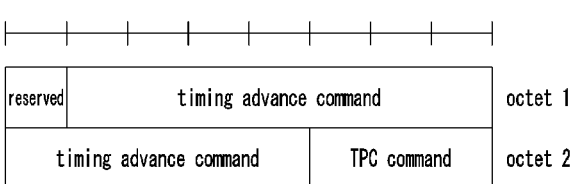
FIG. 12 is a diagram illustrating a second exemplary embodiment of a format of a candidate cell uplink synchronization management response message.

FIG. 12 is a diagram illustrating a second exemplary embodiment of a format of a candidate cell uplink synchronization management response message.

Referring to FIG. 12, a bit 0 of an octet 1 in a candidate cell uplink synchronization management response message may be designated as a reserved bit. In the candidate cell uplink synchronization management response message, bits 1 to 7 of the octet 1 and bits 0 to 4 of an octet 2 may be designated as a timing advance command field for uplink synchronization. In addition, bits 5 to 7 of the octet 2 in the candidate cell uplink synchronization management response message may be designated as a TPC command field for uplink transmission power control. Here, the TPC command field may be set to 0 as reserved bits if uplink transmission power control is not supported through the candidate cell uplink synchronization management procedure. The candidate cell uplink synchronization management response message may be a message for uplink synchronization management.

Figure 13:
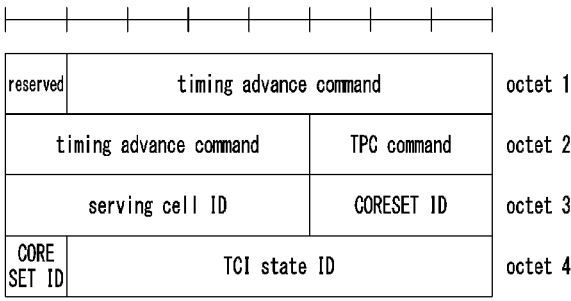
FIG. 13 is a diagram illustrating a third exemplary embodiment of a format of a candidate cell uplink synchronization management response message.

FIG. 13 is a diagram illustrating a third exemplary embodiment of a format of a candidate cell uplink synchronization management response message.

Referring to FIG. 13, a bit 0 of an octet 1 in a candidate cell uplink synchronization management response message may be designated as a reserved bit. In the candidate cell uplink synchronization management response message, bits 1 to 7 of the octet 1 and bits 0 to 4 of an octet 2 may be designated as a timing advance command field for uplink synchronization. In addition, bits 5 to 7 of the octet 2 in the candidate cell uplink synchronization management response message may be designated as a TPC command field for uplink transmission power control. Here, the TPC command field may be set to 0 as reserved bits if uplink transmission power control is not supported through the candidate cell uplink synchronization management procedure.

The candidate cell uplink synchronization management response message may include a transmission configuration indicator (TCI) state indication field. The TCI state indication field may consist of a serving cell ID field indicating the corresponding serving cell ID, a control resource set (CORESET) ID field indicating a CORESET, and a TCI state ID field indicating a TCI state. In this regard, bits 0 to 4 of an octet 3 in the candidate cell uplink synchronization management response message may be designated as the serving cell ID field. In addition, in the candidate cell uplink synchronization management response message, bits 5 to 7 of the octet 3 and a bit 0 of an octet 4 may be designated as the CORESET ID field. In addition, bits 1 to 7 of the octet 4 in the candidate cell uplink synchronization management response message may be designated as the TCI state ID field. Here, the TCI state indication field may be set to 0 as reserved bits if optimal beam indication is not supported through the candidate cell uplink synchronization management procedure. The candidate cell uplink synchronization management response message may be a message for uplink synchronization management and optimal beam indication.

Figure 14:
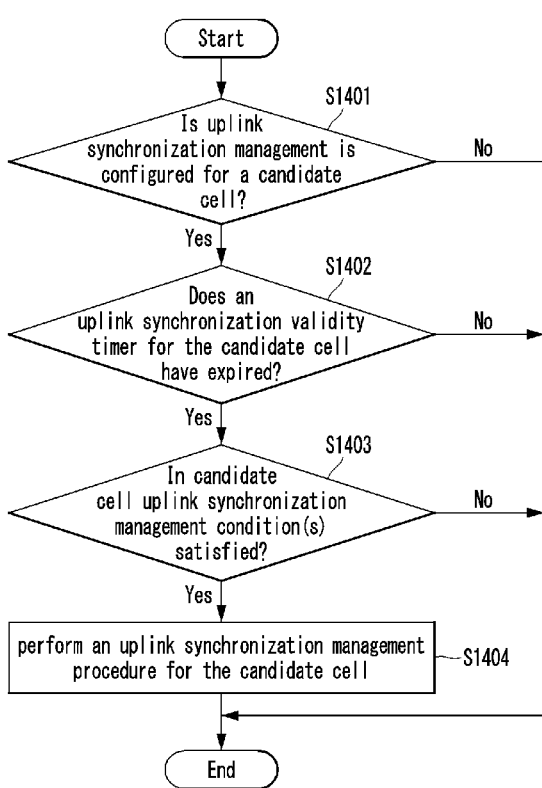
FIG. 14 is a flowchart illustrating a second exemplary embodiment of a synchronization management method in a communication system.

FIG. 14 is a flowchart illustrating a second exemplary embodiment of a synchronization management method in a communication system.

Referring to FIG. 14, in a synchronization management method, a CU of a base station may prepare candidate cells for a terminal. Then, the CU may generate an RRC reconfiguration message including configuration information of selected candidate cells and L1 measurement configuration information, and transmit it to the terminal.

Here, the configuration information of selected candidate cells may include candidate cell uplink synchronization management configuration information. In addition, the candidate cell uplink synchronization management configuration information may include information on whether candidate cell uplink synchronization management is performed for the corresponding candidate cell. In addition, the candidate cell uplink synchronization management configuration information may include a time alignment timer value for a candidate cell uplink synchronization management procedure. Here, the time alignment timer may be an uplink synchronization validity timer. In addition, the candidate cell uplink synchronization management configuration information may include information on whether to perform an L1 measurement result reporting procedure for the candidate cell uplink synchronization management procedure. In addition, the candidate cell uplink synchronization management configuration information may include information on a contention-free random access resource for the candidate cell uplink synchronization management procedure. In addition, the candidate cell uplink synchronization management configuration information may include information on a TDM pattern so that the candidate cell uplink synchronization management procedure can be performed while transmitting and receiving data with the source cell.

In addition, the candidate cell uplink synchronization management configuration information may include specific condition(s) indicating a situation in which a possibility of cell switching to the candidate cell increases. For example, the specific condition(s) may be a strength-specific condition in which a signal strength of the source cell and a signal strength of the candidate cell satisfy a strength-specific event. Here, the strength-specific event may be the event defined in 3GPP TS 38.331 or TS 36.331. Alternatively, the strength-specific event may be a newly defined event. In an exemplary embodiment, the strength-specific event may correspond to a case when the signal strength of the candidate cell is equal to or greater than a certain threshold. In another exemplary embodiment, the strength-specific event may correspond to a case when the signal strength of the source cell is equal to or less than a certain threshold. In another exemplary embodiment, the strength-specific event may correspond to a case when the signal strength of the candidate cell is equal to or greater than a certain threshold and the signal strength of the source cell is equal to or less than a certain threshold. In another exemplary embodiment, the strength-specific event may correspond to a case when the signal strength of the candidate cell is greater than the signal strength of the source cell by a certain offset or more. The above-described signal strength of the source cell or candidate cell may be at least one of a reference signal received power (RSRP), reference signal received quality (RSRQ), or signal to interference and noise ratio (SINR). Here, the signal strength of the source cell or candidate cell may be an L1 measurement result, a measurement result by applying an L1 filter, a measurement result by applying an L3 filter additionally to the measurement result by applying an L1 filter, and/or the like. In another exemplary embodiment, the strength-specific event may, if necessary, further include a restriction that determines that the strength-specific condition is satisfied when the above-described strength-specific event is satisfied for a certain period of time.

Meanwhile, the specific-condition(s) may be a location-specific condition in which the current location of the terminal satisfies a location-specific event. Here, the location-specific event may be the event defined in 3GPP TS 38.331 or TS 36.331. Alternatively, the location-specific event may be a newly defined event. In an exemplary embodiment, the location-specific event may correspond to a case when a distance between the current location of the terminal and a reference location of the candidate cell is less than or equal to a certain threshold. In another exemplary embodiment, the location-specific event may correspond to a case when the distance between the current location of the terminal and the reference location of the source cell is equal to or greater than a certain threshold. In another exemplary embodiment, the location-specific event may correspond to a case when the distance between the current location of the terminal and the reference location of the candidate cell is less than or equal to a certain threshold, and a distance between the current location of the terminal and a reference location of the source cell is greater than or equal to a certain threshold. In another exemplary embodiment, the location-specific event may, if necessary, further include a restriction that determines that the location-specific condition is satisfied when the above-described location-specific event is satisfied for a certain period of time. The location-specific event of the terminal may be configured in combination with the strength-specific event.

Meanwhile, the specific-condition(s) may be a time-specific condition in which a time measured by the terminal satisfies a time-specific event. Here, the time-specific event may be the event defined in 3GPP TS 38.331 or TS 36.331. Alternatively, the time-specific event may be a newly defined event. In an exemplary embodiment, the time-specific event may correspond to a case when a time measured by the terminal is greater than a specific threshold. In another exemplary embodiment, the time-specific event may correspond to a case when the time measured by the terminal is greater than a specific threshold and less than a value obtained by adding a specific unit time to the specific threshold. The time-specific event may be configured in combination with the strength-specific event.

Meanwhile, in case of a terminal capable of signal strength prediction, the specific condition(s) may be a strength prediction-specific condition in which a signal strength prediction result at a specific time point satisfies a strength prediction-specific event. The strength prediction-specific event may be applied similarly to the strength-specific event described above. In an exemplary embodiment, the strength prediction-specific event may correspond to a case when a current signal strength measurement result satisfies a strength-specific event and a signal strength prediction result at a specific time point satisfies a strength-specific event. In this case, the two strength-specific events may be the same strength-specific event or different strength-specific events.

Meanwhile, in case of a terminal capable of location prediction, the specific condition(s) may be a location prediction-specific condition in which a location prediction result at a specific time point satisfies a location prediction-specific event. The location prediction-specific event may be applied similarly to the location specific-event described above. In an exemplary embodiment, the location prediction specific-event may correspond to a case when a current location satisfies a location-specific event and a location prediction result at a specific time point satisfies a location-specific event. In this case, the two location-specific events may be the same location-specific event or different location-specific events.

Meanwhile, when two or more specific conditions are configured, the candidate cell uplink synchronization management configuration information may be configure to cause to perform a candidate cell uplink synchronization management procedure when all the specific conditions are satisfied. On the other hand, when two or more specific conditions are configured, the candidate cell uplink synchronization management configuration information may be configured to cause to perform a candidate cell uplink synchronization management procedure when one specific condition is satisfied.

In addition, the candidate cell uplink synchronization management configuration information may include specific reporting condition(s), and may be configured to cause the terminal to report an L1 measurement result to the candidate DU of the base station when the specific reportion condition(s) are satisfied. Here, the specific condition(s) may be the same as at least one of the strength-specific condition, location-specific condition, time-specific condition, strength prediction-specific condition, location prediction-specific condition, or time prediction specific-condition. Alternatively, the specific reporting condition(s) may be different from the strength-specific condition, location-specific condition, time-specific condition, strength prediction-specific condition, location prediction-specific condition, or time prediction-specific condition.

Meanwhile, the terminal may receive the RRC reconfiguration message from the CU unit, and obtain the configuration information of candidate cells and the configuration information for L1 measurement. Then, the terminal may perform L1 measurement on the candidate cells, and the terminal may determine whether uplink synchronization management is configured for the candidate cells (S1401). As a result of the determination, uplink synchronization management may not have been configured for a plurality of candidate cells. In this case, the terminal may terminate the synchronization management method. On the other hand, as a result of the determination, uplink synchronization management may have been configured for candidate cells. In this case, the terminal may perform a candidate cell uplink synchronization management procedure according to the candidate cell uplink synchronization management configuration information.

To this end, the terminal may determine whether an uplink synchronization validity timer for the corresponding candidate cell has expired (S1402). As a result of the determination, the uplink synchronization validity timer for the corresponding candidate cell may not have expired and may be running. In this case, the terminal may determine that the uplink synchronization for the candidate cell is valid. In this case, the terminal may terminate the synchronization management method. On the other hand, as a result of the determination, the uplink synchronization validity timer for the corresponding candidate cell may have expired and may not be running. In this case, the terminal may determine that the uplink synchronization for the corresponding candidate cell is invalid.

Then, the terminal may determine whether candidate cell uplink synchronization management condition(s) are satisfied (S1403). Here, the candidate cell uplink synchronization management condition(s) may mean at least one specific condition among the strength-specific conditions, location-specific condition, time-specific condition, strength prediction-specific condition, location prediction-specific condition, or time prediction-specific condition.

As a result of the determination, if the candidate cell uplink synchronization management condition(s) are not satisfied, the terminal may terminate the procedure. On the other hand, if the candidate cell uplink synchronization management condition(s) are not satisfied, the terminal may perform the uplink synchronization management procedure for the candidate cell (S1404).

In the candidate cell uplink synchronization management procedure, the terminal may receive a candidate cell uplink synchronization management response message from the candidate DU of the base station. In this case, the terminal may start or restart the uplink synchronization validity timer for the corresponding candidate cell. The timer value may be included in the candidate cell uplink synchronization management configuration information. Alternatively, the timer value may be a predetermined value.

On the other hand, if L1 measurement reporting is configured in the candidate cell uplink synchronization management configuration information included in the configuration information of candidate cells, specific reportion condition(s) may be included in the candidate cell uplink synchronization management configuration information so that the L1 measurement reporting is performed for the candidate cell uplink synchronization management procedure only when the specific reporting condition(s) are satisfied. The specific reporting condition(s), which are the same as or different from the specific condition(s) included in the candidate cell uplink synchronization management configuration information, may be separately included so that the candidate cell uplink synchronization management procedure is performed.

Meanwhile, information on a TDM pattern may be included in the candidate cell uplink synchronization management configuration information. In this case, the terminal may transmit a random access preamble to the corresponding candidate cell at an uplink allocation time for the candidate cell uplink synchronization management procedure according to the TDM pattern. In addition, the terminal may receive a random access response message at a downlink allocation time for the candidate cell uplink synchronization management procedure according to the TDM pattern.

Meanwhile, the above-described candidate cell uplink synchronization management method and conditional candidate cell uplink synchronization management method may be applied to a conditional handover in the same manner as in LTM. If conditional handover configuration information received from the source base station includes the candidate cell uplink synchronization management configuration information, the terminal may perform the candidate cell uplink synchronization management procedure for a conditional handover candidate cell according to the configuration information.

When the terminal is configured to perform the candidate cell uplink synchronization management procedure, if the uplink synchronization validity timer for the conditional handover candidate cell is running, the terminal may determine that the uplink synchronization for the candidate cell is valid. When the uplink synchronization validity timer for the candidate cell expires, the terminal may perform the candidate cell uplink synchronization management procedure for the candidate cell.

Unlike LTM, in the conditional handover, the terminal may determine to execute the handover when handover execution condition(s) are satisfied. Accordingly, the terminal may autonomously determine specific condition(s) for performing the candidate cell uplink synchronization management procedure when the handover execution condition(s) are satisfied. In an exemplary embodiment, the specific condition(s) for performing the candidate cell uplink synchronization management procedure may be determined based on the configured handover execution condition(s). The candidate cell uplink synchronization management configuration method and the conditional candidate cell uplink synchronization management configuration method may be equally applied to candidate cell uplink synchronization management configuration information of conditional handover configuration information.

Figure 15:
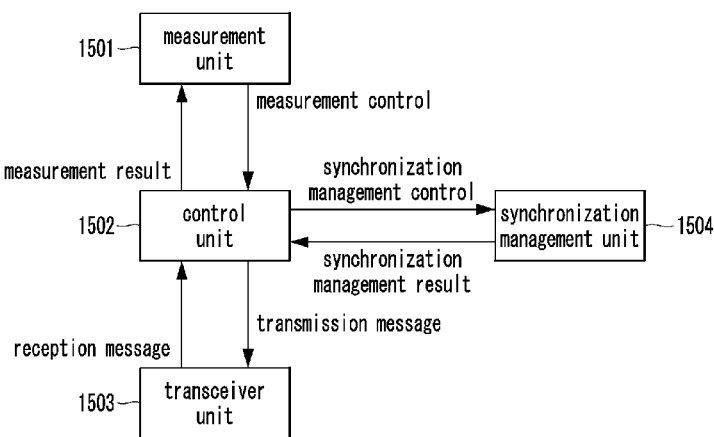
FIG. 15 is a block diagram illustrating a first exemplary embodiment of a terminal of a synchronization management apparatus in a communication system.

FIG. 15 is a block diagram illustrating a first exemplary embodiment of a terminal of a synchronization management apparatus in a communication system.

Referring to FIG. 15, a terminal may include a measurement unit 1501, a control unit 1502, a transceiver unit 1503, and a synchronization management unit 1504. In the above-described configuration, the transceiver unit 1503 may deliver a message received from a base station to the control unit 1502. The control unit 1502 may receive the message from the transceiver unit 1503, and may deliver measurement control-related information to the measurement unit 1501 according to configuration information of the received message. In addition, the control unit 1502 may deliver synchronization management control-related information to the synchronization management unit 1504 according to the configuration information of the received message.

The measurement unit 1501 may measure signal strengths of a serving cell and neighboring cells according to the measurement control-related configuration information received from the control unit 1502. Then, the measurement unit 1501 may deliver a measurement result to the control unit 1502. When necessary, the control unit 1502 may additionally deliver synchronization management control-related information to the synchronization management unit 1504 according to the measurement result received from the measurement unit 1501.

The synchronization management unit 1504 may perform a candidate cell uplink synchronization management procedure if necessary according to the synchronization management control-related configuration information received from the control unit 1502. When necessary, the synchronization management unit 1504 may deliver a synchronization management result to the control unit 1502. If there is information to report to the base station based on the measurement result received from the measurement unit 1501 and the synchronization management result received from the synchronization management unit 1504, the control unit 1502 may configure a transmission message, and deliver it to the transceiver unit 1503, so that the transmission message is transmitted.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:
 receiving, from a centralized unit (CU) of a base station, configuration information of one or more candidate cells and configuration information for measurement;
 performing layer 1 (L1) measurement on the one or more candidate cells based on the configuration information for measurement;
 acquiring uplink synchronization for the one or more candidate cells by performing an uplink synchronization management procedure for the one or more candidate cells based on the configuration information of the one or more candidate cells;
 reporting a result of the L1 measurement to a distributed unit (DU) of the base station;
 receiving, from the DU of the base station, information on a target cell, being the target cell to switch among the one or more candidate cells, based on the result of the L1 measurement; and
 applying the uplink synchronization acquired through the uplink synchronization management procedure to the target cell.

2. The method according to claim 1, further comprising:
 accessing the target cell; and
 in response to completion of accessing the target cell, transmitting a cell switching complete message to the target cell.

3. The method according to claim 1, wherein the acquiring of the uplink synchronization for the one or more candidate cells comprises:
 determining whether uplink synchronization management is configured for the one or more candidate cells based on the configuration information of the one or more candidate cells;
 in response to determining that the uplink synchronization management is configured, determining whether an uplink synchronization validity timer has expired for the one or more candidate cells;
 in response to determining that the uplink synchronization validity timer has expired for the one or more candidate cells, performing the uplink synchronization management procedure for the one or more candidate cells; and
 acquiring the uplink synchronization for the one or more candidate cells through the uplink synchronization management procedure.

4. The method according to claim 3, wherein the configuration information of the one or more candidate cells includes configuration information of preambles for random access, and the performing of the uplink synchronization management procedure for the one or more candidate cells in response to determining that the uplink synchronization validity timer has expired for the one or more candidate cells comprises:
 in response to determining that the uplink synchronization validity timer has expired for the one or more candidate cells, selecting a preamble from among the preambles for random access;
 transmitting the selected preamble to the one or more candidate cells; and
 receiving a random access response (RAR) including a timing advance command for the uplink synchronization from the one or more candidate cells.

5. The method according to claim 3, wherein the configuration information of the one or more candidate cells includes information on a time division multiplexing (TDM) pattern, and the terminal transmits the preamble to a corresponding candidate cell at an uplink allocation time for the uplink synchronization management procedure according to the TDM pattern, and receives an RAR at a downlink allocation time for the uplink synchronization management procedure according to the TDM pattern.

6. The method according to claim 3, further comprising, after the determining of whether the uplink synchronization validity timer has expired for the one or more candidate cells, determining whether a condition to perform uplink synchronization management is satisfied for the one or more candidate cells, wherein when the condition to perform uplink synchronization management is satisfied, the uplink synchronization management procedure for the one or more candidate cells is performed.

7. The method according to claim 6, wherein the condition of perform uplink synchronization management is at least one of a strength-specific condition, a location-specific condition, a time-specific condition, a strength prediction-specific condition, a location prediction-specific condition, or a time prediction-specific condition.

8. A terminal comprising a processor, wherein the processor causes the terminal to perform:

receiving, from a centralized unit (CU) of a base station, configuration information of one or more candidate cells and configuration information for measurement;

performing layer 1 (L1) measurement on the one or more candidate cells based on the configuration information for measurement;

acquiring uplink synchronization for the one or more candidate cells by performing an uplink synchronization management procedure for the one or more candidate cells based on the configuration information of the one or more candidate cells;

reporting a result of the L1 measurement to a distributed unit (DU) of the base station;

receiving, from the DU of the base station, information on a target cell, being the target cell to switch among the one or more candidate cells, based on the result of the L1 measurement; and applying the uplink synchronization acquired through the uplink synchronization management procedure to the target cell.

9. The terminal according to claim 8, wherein the processor further causes the terminal to perform:

accessing the target cell; and in response to completion of accessing the target cell, transmitting a cell switching complete message to the target cell.

10. The terminal according to claim 8, wherein in the acquiring of the uplink synchronization for the one or more candidate cells, the processor further causes the terminal to perform:

determining whether uplink synchronization management is configured for the one or more candidate cells based on the configuration information of the one or more candidate cells;

in response to determining that the uplink synchronization management is configured, determining whether an uplink synchronization validity timer has expired for the one or more candidate cells;

in response to determining that the uplink synchronization validity timer has expired for the one or more candidate cells, performing the uplink synchronization management procedure for the one or more candidate cells; and acquiring the uplink synchronization for the one or more candidate cells through the uplink synchronization management procedure.

11. The terminal according to claim 10, wherein the configuration information of the one or more candidate cells includes configuration information of preambles for random access, and in the performing of the uplink synchronization management procedure for the one or more candidate cells in response to determining that the uplink synchronization validity timer has expired for the one or more candidate cells, the processor further causes the terminal to perform:

in response to determining that the uplink synchronization validity timer has expired for the one or more candidate cells, selecting a preamble from among the preambles for random access;

transmitting the selected preamble to the one or more candidate cells; and receiving a random access response (RAR) including a timing advance command for the uplink synchronization from the one or more candidate cells.

12. The terminal according to claim 10, wherein the processor further causes the terminal to perform, after the determining of whether the uplink synchronization validity timer has expired for the one or more candidate cells, determining whether a condition to perform uplink synchronization management is satisfied for the one or more candidate cells, wherein when the condition to perform uplink synchronization management is satisfied, the uplink synchronization management procedure for the one or more candidate cells is performed.

\* \* \* \* \*